United States Patent
Nelson

(10) Patent No.: US 9,440,401 B1
(45) Date of Patent: Sep. 13, 2016

(54) METHOD FOR PRODUCING COMPOSITE LAMINATED PARTS WITH NON-RULED SURFACES

(71) Applicant: The Boeing Company, Seal Beach, CA (US)

(72) Inventor: Paul E. Nelson, University Place, WA (US)

(73) Assignee: The Boeing Company, Chicago, IL (US)

( * ) Notice: Subject to any disclaimer, the term of this patent is extended or adjusted under 35 U.S.C. 154(b) by 547 days.

(21) Appl. No.: 13/709,856

(22) Filed: Dec. 10, 2012

(51) Int. Cl.
*B29C 70/30* (2006.01)
*B32B 3/28* (2006.01)
*B32B 37/02* (2006.01)
*B29C 70/54* (2006.01)

(52) U.S. Cl.
CPC ............ *B29C 70/30* (2013.01); *B29C 70/543* (2013.01); *B32B 3/28* (2013.01); *B32B 37/02* (2013.01)

(58) Field of Classification Search
None
See application file for complete search history.

(56) References Cited

U.S. PATENT DOCUMENTS

| | | |
|---|---|---|
| 6,730,184 B2 * | 5/2004 | Kondo et al. ............... 156/221 |
| 6,814,916 B2 | 11/2004 | Wilden et al. |
| 7,527,759 B2 | 5/2009 | Lee et al. |
| 7,588,655 B2 | 9/2009 | Pham et al. |
| 8,118,959 B2 | 2/2012 | Nelson et al. |
| 8,142,181 B2 | 3/2012 | Willden et al. |
| 2013/0049258 A1 | 2/2013 | Rotter et al. |

OTHER PUBLICATIONS

P. Potluri, et al., "Comprehensive Drape Modelling for Moulding 3D Textile Preforms", Composites: Part A 32, pp. 1415-1424, 2001 UK.

* cited by examiner

*Primary Examiner* — Benjamin Schiffman
(74) *Attorney, Agent, or Firm* — Nexsen Pruet, PLLC

(57) ABSTRACT

Methods and apparatuses are disclosed for forming a three-dimensional object on a lamination mandrel having preselected areas comprising raised surface features, and forming a laminate with raised or lowered areas in preselected locations on the laminate such that the part comprises a wrinkle-free surface. The object is preferably a non-ruled part comprising a substantially wrinkle-free surface, and, according to preferred variations, the object is selected from the group including, for example, a joggled blade stringer, a joggled hat stringer, a curved spar, a joggled skin, etc.

13 Claims, 12 Drawing Sheets

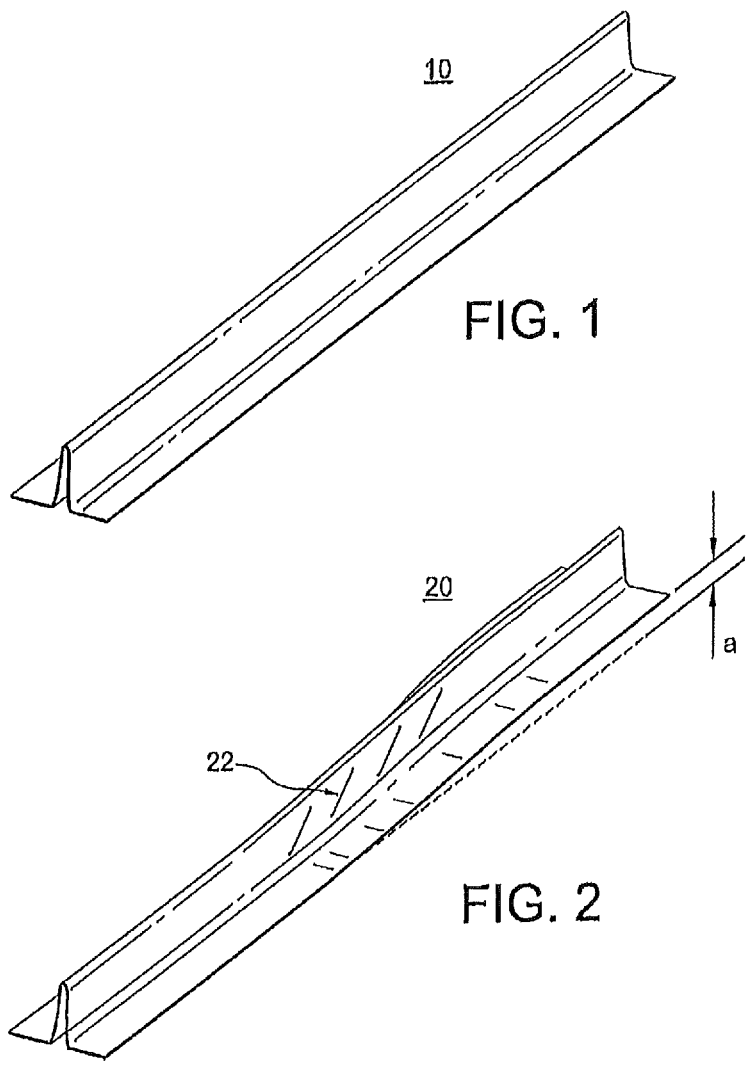

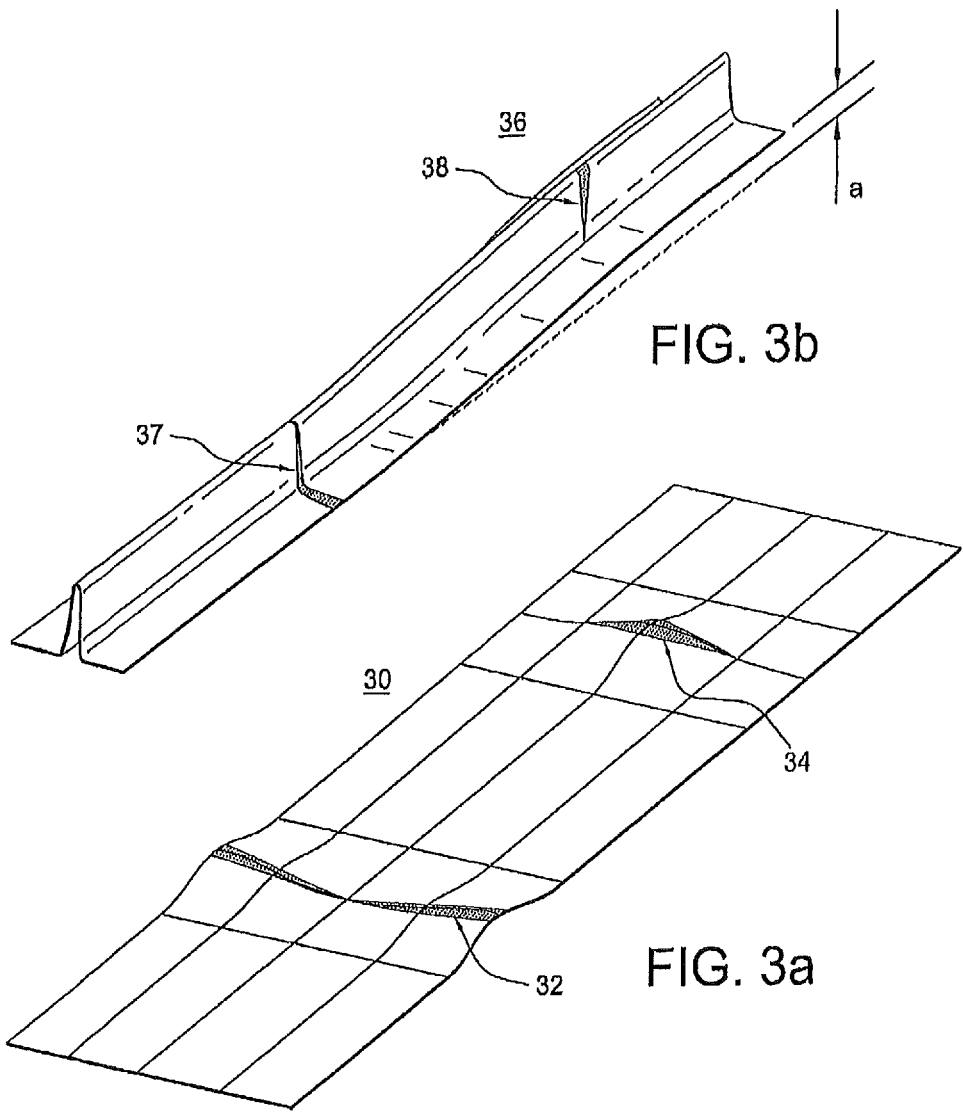

METHOD FOR PRODUCING COMPOSITE LAMINATED PARTS WITH NON-RULED SURFACES

TECHNOLOGICAL FIELD

The present disclosure relates generally to the field of forming complex, three dimensionally-shaped objects and surfaces. More specifically, the present disclosure relates to methods and apparatuses for forming complex three-dimensional surfaces on composite parts for aircraft structures for the purpose of preparing predictable finished surfaces on the structures in their end use.

BACKGROUND

Composite laminates for aircraft structures often have precise and complex final shape requirements. According to known methods, the most cost effective production method is to produce an uncured flat laminate that is then formed to the desired shape. However, except for simple forms with ruled surfaces, many other shapes may result in less than desirable characteristics, such as, for example, wrinkling during and after formation.

Wrinkling may often be mitigated by various approaches, each having drawbacks. For example, for the formation of certain non-ruled aircraft structures, such as joggled stringers, etc., attempts to overcome wrinkling have been attempted by altering the design of the joggle to a shallower ramp angle. However, such design alterations undesirably add to the weight of the object structure. Further, attempts at manual lamination have been tried for the fabrication of complex parts. However, the labor costs to effect the manual production can often be prohibitive. Further unsuccessful attempts to suppress wrinkles have included cutting fibers in specific areas. Such attempts help in some cases, but may reduce mechanical properties and thus require an undesirable weight increase. Once again, such efforts have not produced reliable results without offsetting shortcomings.

BRIEF SUMMARY

The present disclosure relates to methods for forming a three-dimensional object comprising the steps of providing a lamination mandrel having preselected areas comprising non-planar surface features, preferably raised surfaces, providing a laminate material to the lamination mandrel, forming a laminate with raised or lowered areas in preselected locations on the laminate, removing the laminate from the lamination mandrel, and forming the laminate into a three-dimensional object, such that the part comprises a wrinkle-free surface. The object is preferably a non-ruled part comprising a substantially wrinkle-free surface, and, according to preferred variations, the object is selected from the group including, for example, a joggled blade stringer, a joggled hat stringer, a curved spar, a joggled skin, etc.

According to one variation, a second forming mandrel is provided, and the laminate with raised areas in preselected locations is provided to the second forming mandrel to form the laminate into a three-dimensional object. The laminate may be a fiber-containing laminate, and the object may be a part for a vehicle. The vehicle preferably is selected from the group consisting of terrestrial vehicles, underwater vehicles, spacecraft vehicles, and aircraft vehicles.

According to further variations, the step of forming a laminate with non-planar, and preferably raised areas in preselected locations on a laminate having a first surface area increases the surface area of the laminate. In a further variation, the preselected areas comprising raised surface features comprise a plurality of preselected geometric configurations.

The present disclosure also relates to a method for forming a three-dimensional object comprising the steps of providing a mandrel having preselected areas comprising raised surface features, providing a material to the mandrel, forming a material with raised areas in preselected locations on the material, removing the material from the mandrel, and forming the material into a part, such that the part comprises a wrinkle-free surface.

Still further, the present disclosure relates to a three-dimensional object having a three dimensional surface, said object made according to a process comprising the steps of providing a lamination mandrel having preselected areas comprising non-planar, and preferably raised surface features, providing a laminate material to the lamination mandrel, forming a laminate with raised areas in preselected locations on the laminate, removing the laminate from the lamination mandrel, and forming the laminate into an object, such that the object comprises a wrinkle-free surface. The object is preferably a non-ruled part comprising a substantially wrinkle-free surface, and, according to preferred variations, the object is selected from the group consisting of a joggled blade stringer, a joggled hat stringer, a curved spar, a joggled skin, etc. Alternatively, the process further comprises the steps of providing a second forming mandrel and providing the laminate with non-planar, and preferably raised areas in preselected locations to the second forming mandrel to form the laminate into an object.

According to one variation, the three-dimensional object is made from a fiber-containing laminate, and the object is a part for a vehicle or structure such as, for example, a terrestrial vehicle or structure, an underwater vehicle or structure, a spacecraft vehicle or structure, and an aircraft vehicle or structure.

According to further variations, the object is made from a laminate with non-planar and preferably raised areas in preselected locations on a laminate to increase the surface area of the laminate. In a further variation, the preselected areas comprising non-planar surface features comprise a plurality of preselected geometric configurations.

The present disclosure also relates to a three-dimensional object made according to a method for forming such an object comprising the steps of providing a mandrel having preselected areas comprising non-planar, and preferably raised surface features, providing a material to the mandrel, forming a material with raised areas in preselected locations on the material, removing the material from the mandrel, and forming the material into a part, such that the part comprises a wrinkle-free surface.

BRIEF DESCRIPTION OF THE DRAWING(S)

Having thus described variations of the disclosure in general terms, reference will now be made to the accompanying drawings, which are not necessarily drawn to scale, and wherein:

FIG. 1 shows a perspective view of a blade stringer (having a ruled surface) formed from a flat laminate;

FIG. 2 shows a perspective view of a blade stringer with a joggle (having a non-ruled surface), showing surface wrinkles occurring during formation;

FIG. 3a shows a wrinkle-free joggled blade stringer;

FIG. 3b shows a nearly flat laminate having preselected surface alterations used to make the joggled blade stringer shown in FIG. 3a;

FIG. 6b shows a nearly flat laminate with preselected surface alterations used to make the joggle hat stringer shown in FIG. 6a;

FIG. 8 shows punch and die mandrels for forming the joggled hat stringer of FIG. 6a;

FIG. 9b shows a nearly flat mandrel for laminating the wing rib of FIG. 9a;

FIG. 10b shows a lamination having preselected surface alterations for forming the curved spar of FIG. 10a;

FIG. 11b shows a lamination having preselected surface alterations for forming the curved spar of FIG. 11a;

DETAILED DESCRIPTION

Figure 4:
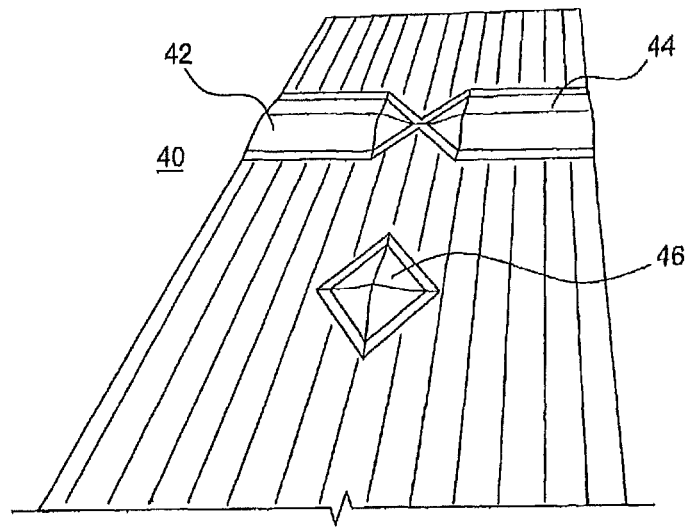
FIG. 4 shows a perspective plan view of a lamination mandrel with preselected raised shaping features.

The present disclosure is directed to producing substantially flat laminations that may be formed into numerous types of non-ruled surface structures, without effecting wrinkles or unacceptable defects or other surface irregularities into the laminate.

According to the present disclosure, a composition lamination is produced on a specialty mandrel that is substantially flat, but that possesses integral features at preselected locations to produce preselected effects in the finished laminate. The features comprise non-planar features (such as, for example, elevations, raised areas or recesses, etc.) as desired, such that the design of the mandrel surface is compatible with the selected lamination materials, methods and equipment. For example, larger surface feature elevations may be better suited for use with a fiber placement machine as opposed to a tape laminating machine. The preselected surface elevations or recesses cause the lamination being produced on the mandrel to have additional fiber length or surface area in key preselected locations on the lamination part. According to one variation, after lamination, the uncured charge preferably is removed from the lamination mandrel and placed on a forming mandrel set. The forming mandrel set compresses the laminate into a final or near final shape. The extra fiber lengths induced into the lamination by the preselected surface features on the forming mandrel enable the laminate to be formed into shapes, such as, for example, joggled stringers, that have non-ruled surfaces. According to one variation, the process may be viewed as intentionally placing specific surface features, or "wrinkles" into precise, preselected locations on flat charge, such that, upon final shaping, such "wrinkles" provide the additional material necessary for final part shaping as the "wrinkles" are "pulled out" or smoothed during final part formation into a final part shape.

Potential applications for the methods and apparatuses disclosed herein abound; most preferably with respect to the production of smooth-surfaced, wrinkle-free, non-ruled finished parts produced from nearly flat preforms or laminates. Potential applications include, non-exclusively, the manufacture of aircraft spars with a localized curve, swept spars having significant curvature of their length of, for example, more than 20°, spars with elevation view curvature, stringers curved in one or more axes, etc.

FIG. 1 shows a perspective view of a prior art, nearly flat laminate 10 before final shaping into a joggled blade stringer. FIG. 2 shows the laminate 10 of FIG. 1 shaped into a joggled blade stringer 20. The distance "a" shown in FIG. 2 represents the height that one end of the joggled blade stringer is shaped or "bent" away from a completely planar surface present, for example, with the laminate 10. The finished joggled blade stringer 20 is therefore not a ruled surface. This leads to undesired wrinkles 22 being induced into the joggled blade stringer 20.

FIG. 3a shows a nearly flat laminate 30 having preselected sections of laminate material introduced into the laminate at locations 32 and 34. FIG. 3b shows the laminate of FIG. 3a formed into a joggled blade stringer 36. The distance "a" shown in FIG. 3b represents the height that one end of the joggled blade stringer is shaped or "bent" away from a planar surface. Therefore the joggled blade stringer 26 represents a non-ruled surface. The shaded locations 37 and 38 on joggled blade stringer 36 represent the areas on the blade stringer 36 made from the additional material presented at the preselected sections of laminate material at locations 32 and 34 respectively of laminate 30.

Figure 5:
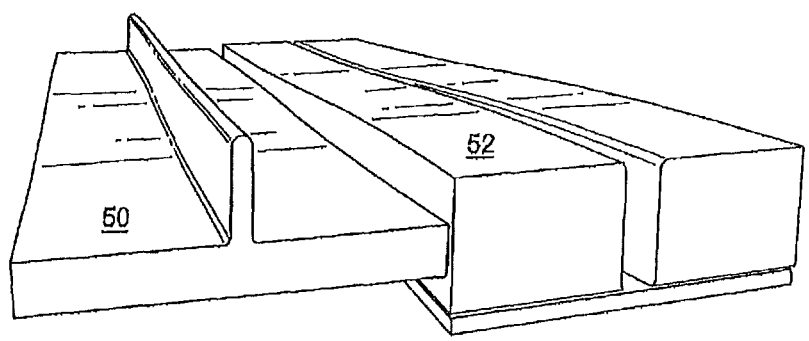
FIG. 5 shows a set of forming mandrels.

FIG. 4 is an elevated longitudinal view of a lamination mandrel 40 comprising preselected surface features in the form of raised areas 42, 44, and 46 to introduce specific features into the laminates made on the mandrel 40. The raised areas generate areas of longer fiber length needed for the forming operation. FIG. 5 shows a set of mating forming mandrels 50, 52 used to shape the laminates made on, for example, lamination mandrel 40 shown in FIG. 4.

Figure 6B:
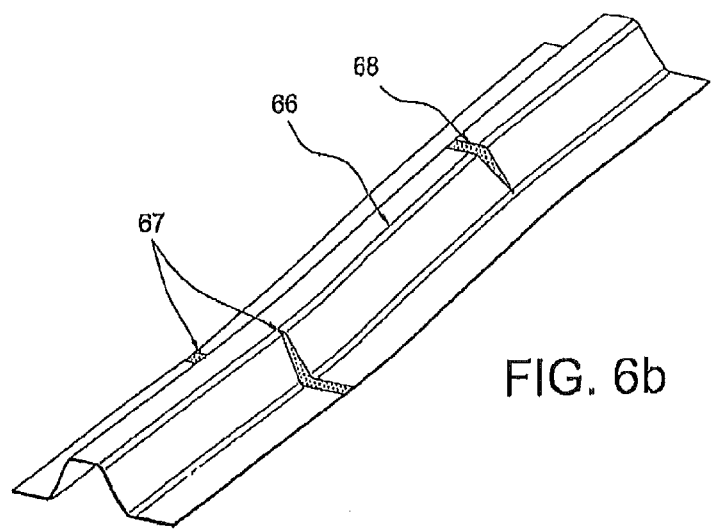
Figure 6A:
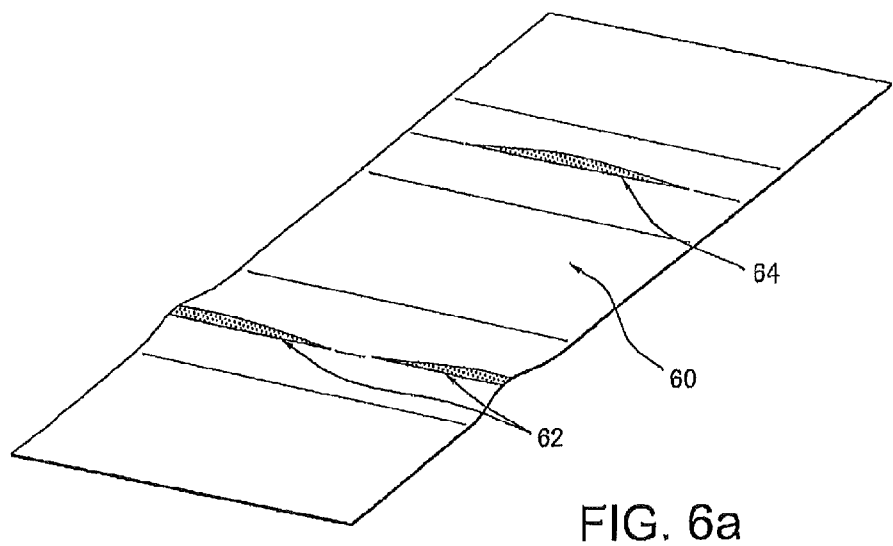
FIG. 6a shows a wrinkle-free joggled hat stringer.

FIG. 6a shows a nearly flat laminate 60 having preselected sections of laminate material introduced into the laminate at locations 62 and 64. FIG. 6b shows the laminate of FIG. 6a formed into a joggled hat stringer 66. The joggled hat stringer 66 represents a non-ruled surface. The shaded locations 67 and 68 on joggled hat stringer 66 represent the areas on the hat stringer 66 made from the additional material presented at the preselected sections of laminate material at locations 62 and 64 respectively of laminate 60.

Figure 7:
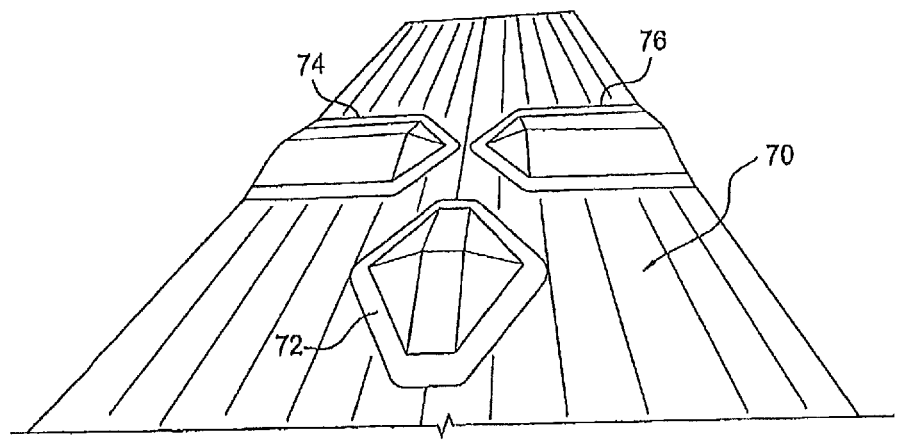
FIG. 7 shows a perspective plan view of a lamination lay up mandrel with raised shaping features.
Figure 8:
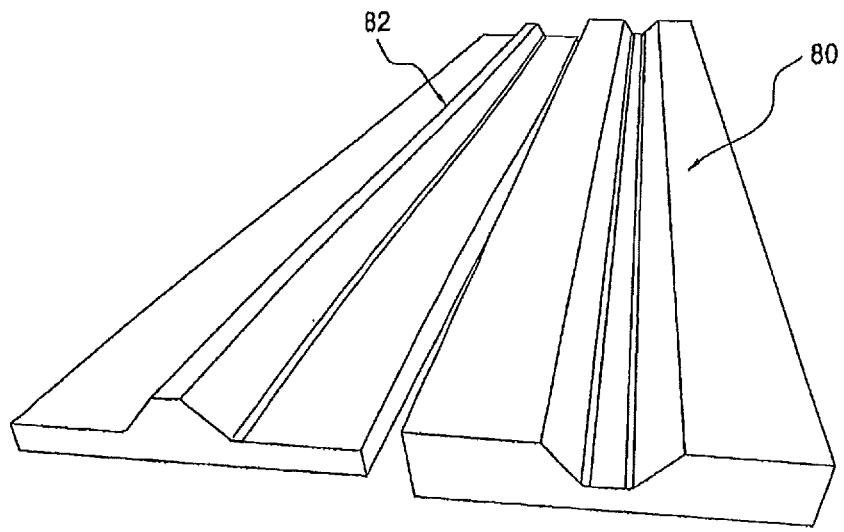

FIG. 7 shows an elevated longitudinal view of a lay-up mandrel 70 comprising preselected surface features 72, 74, 76 in the form of raised areas to introduce specific features into the laminates, such as, for example, the nearly flat laminate 60 used to make the joggled hat stringer 60 (see FIG. 6a). FIG. 8 shows a set of mating forming mandrels 80, 82 used to shape the laminates made on, for example, lamination mandrel 70 shown in FIG. 7, into joggled hat stringers, such as the one shown in FIG. 6b.

Figure 9A:
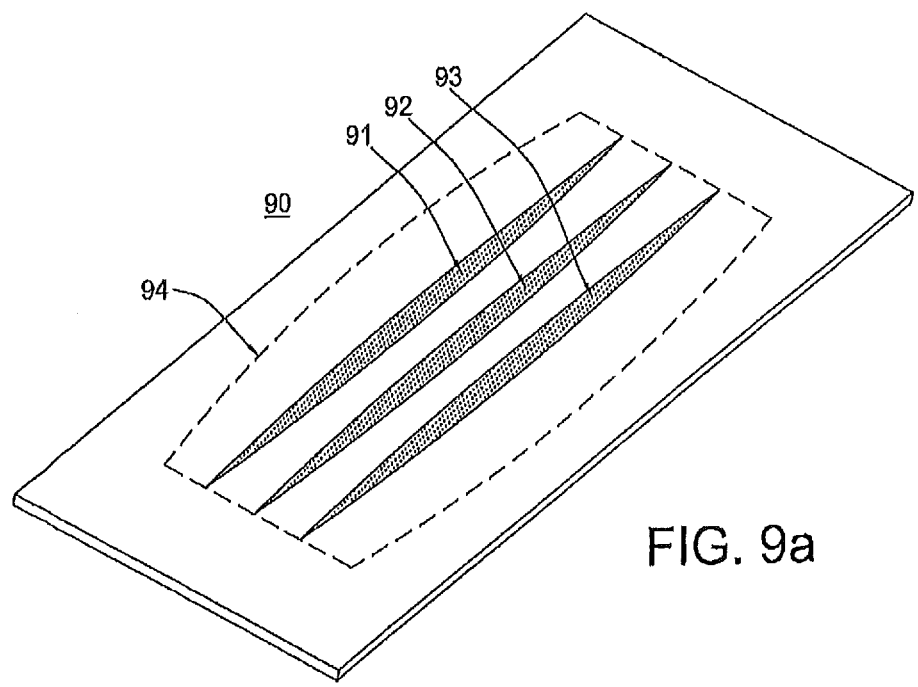
FIG. 9a shows a wrinkle-free wing rib.
Figure 9B:
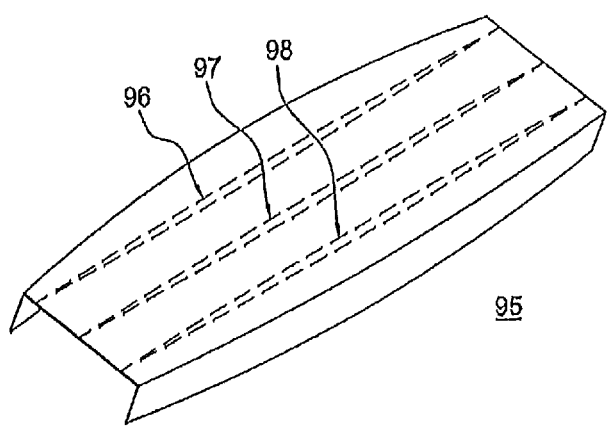

FIG. 9a shows a nearly flat mandrel 90 for laminating a wing rib. Raised elongated regions 91, 92, 93 are precisely oriented onto or into the surface of the mandrel 90. A lamination (not shown) is then assembled onto the mandrel 90 covering an area that is somewhat larger than the final part periphery, shown as a dotted line 94. The uncured lamination is removed from the mandrel 90 and stretched over a rib-shaped mandrel (not shown) to produce the wing rib 95 shown in FIG. 9b. The additional material introduced in the wing rib lamination (not shown) is now flattened into the zones 96, 97 and 98. The wing rib is then subsequently cured and trimmed to shape as would be readily understood by one skilled in the field.

Figure 10A:
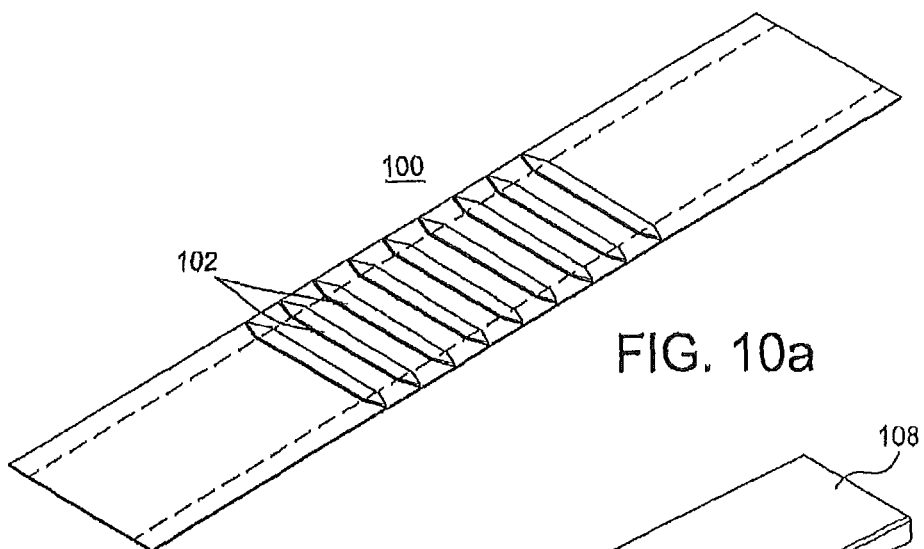
FIG. 10a shows a wrinkle-free curved spar with a curve formed in the plane of the flanges of the spar.
Figure 10B:
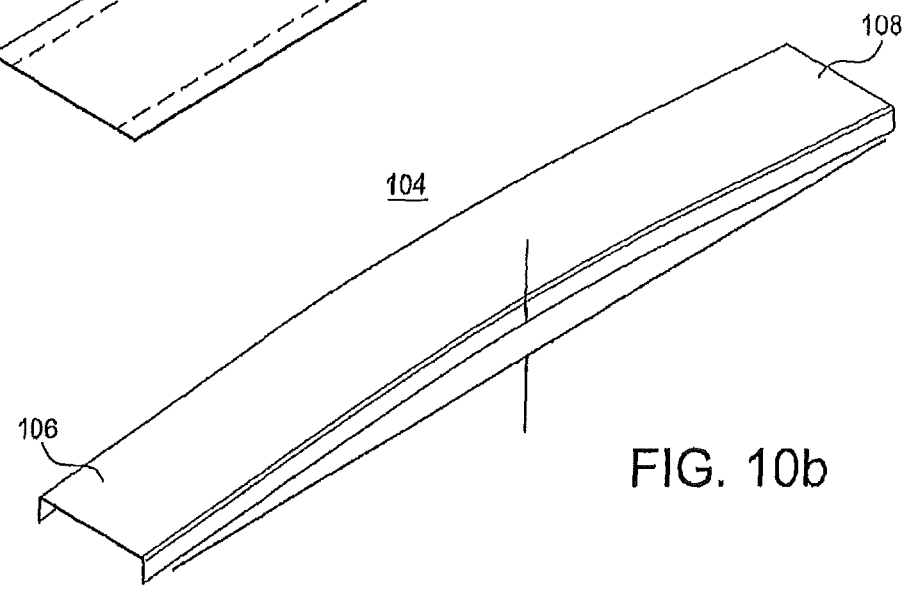
Figure 10C:
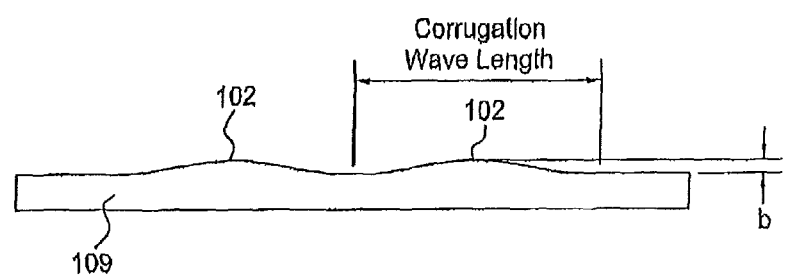
FIG. 10c is a close up perspective view of a section of the laminate of FIG. 12b as laid up.

FIG. 10a shows a lamination 100 for a curved wing spar. The lamination 100 has raised elongated regions, 102 that make up a corrugated region and allow the spar to be formed to a curve in the plane of the flanges of the spar 104 as shown in FIG. 10b. The height shown between arrows in FIG. 10b represents the heights of the mid-region of the spar 104 from the ends 106, 108 of the spar 104, thus illustrating the existence of a curve, and deviation from a planar surface. FIG. 10c shows an enlarged cross-sectional view of a lay-up mandrel 109 showing a portion of the corrugated region with raised elongated regions 102. The distance between arrows "a" and "b" in FIG. 10c represents the corrugation amplitude as measured from the planar surface of the lay-up mandrel 109. The distance from trough to trough between corrugations, is shown as the corrugation wave length.

Figure 11A:
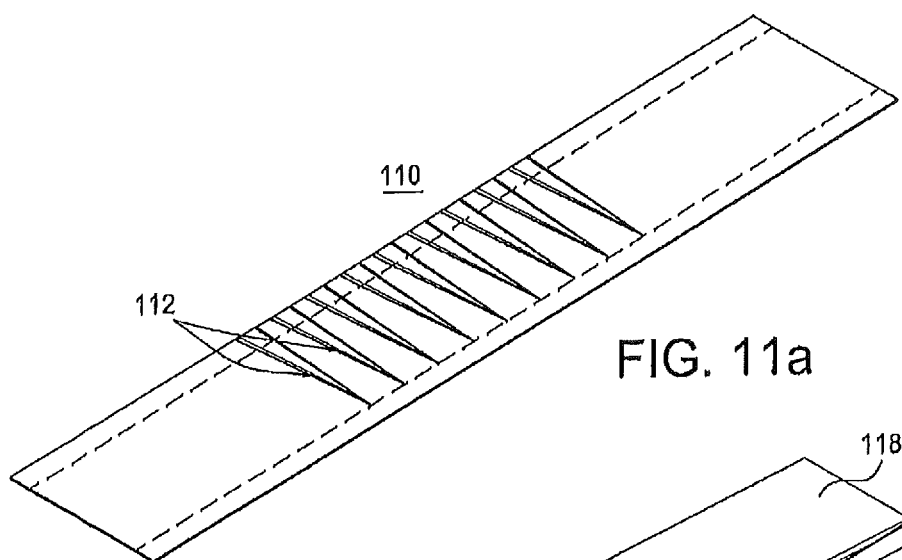
FIG. 11a shows a wrinkle-free curved spar with a curve formed in the plane of the web of the spar.
Figure 11B:
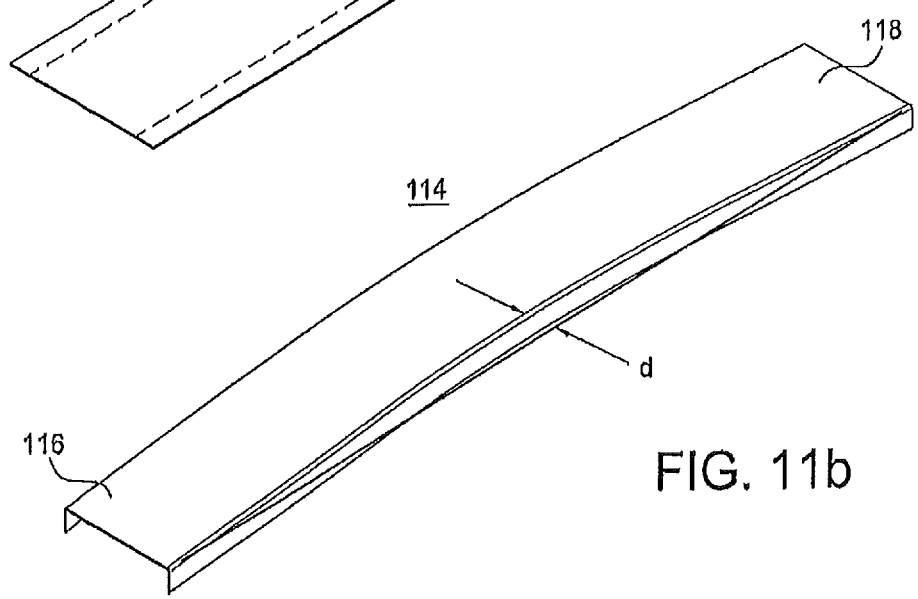

FIG. 11a shows a lamination 110 for another curved wing spar. The lamination 110 has raised elongated regions 112 that allow a spar to be formed to a curve in the plane of the web of the spar 114 as shown in FIG. 11b. The height shown between arrows in FIG. 11b represents the heights of the mid-region of the spar 114 from the ends 116, 118 of the spar 114, thus illustrating the existence of a curve, and deviation from a planar surface. Although not shown, further examples are contemplated by the present disclosure combining, for example, the attributes of the laminations shown in FIGS. 10a-b and FIGS. 11a-b to provide a lamination that can be formed in multiple axes.

Figure 12:
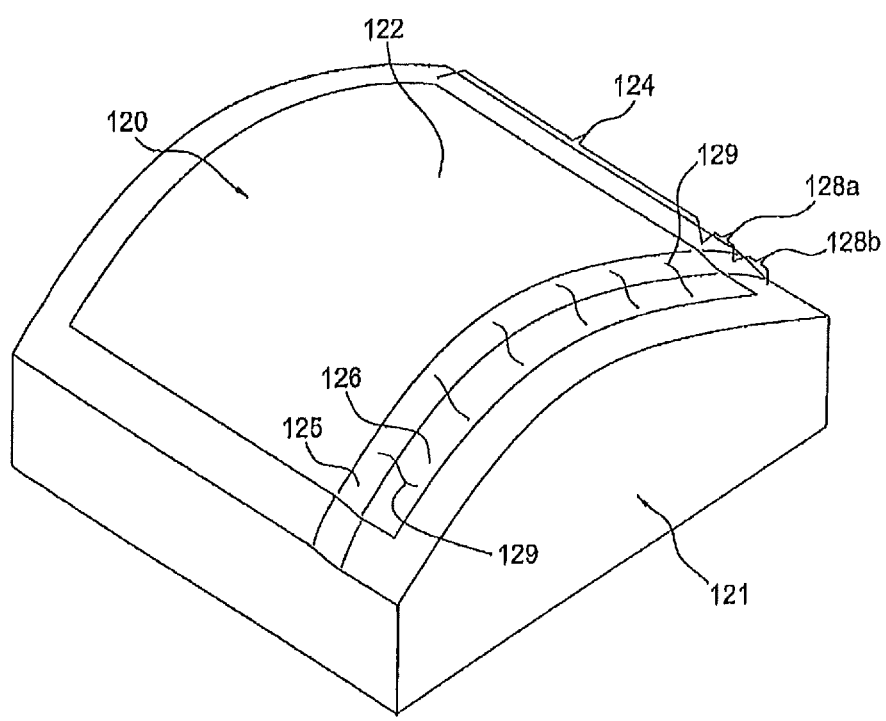
FIG. 12 shows a generally cylindrical portion of a fuselage skin with at least one section having a varied radius.

FIG. 12 shows a generally cylindrical portion of a fuselage skin 120 on a cure mandrel 121 having a preselected surface design that is desired to be imparted on a fuselage skin part. One end 122 of the fuselage skin 120 incorporates a first cylindrical section having a first radius 124 and a transition section 125 transitions to a varying radius 126. As shown, the varying radius 126 is smaller than the major radius 124. As shown, a conic transition occurs in one or more gradual "steps". As shown in FIG. 12, the conic transition occurs in two "steps", 128a and 128b. The objective of the stepped area is providing space for a local and predictable thickening of the laminate with subsequent plies (not shown). This fulfills a structural requirement while permitting the final exterior surface of the fuselage section to be smooth. Since these interior plies are not laid on an ruled surface, the plies are susceptible to wrinkles 129 as indicated. While shown as a section, it is understood that the cure mandrel 121 could be in the shape of a cylinder (not shown).

Figure 13:
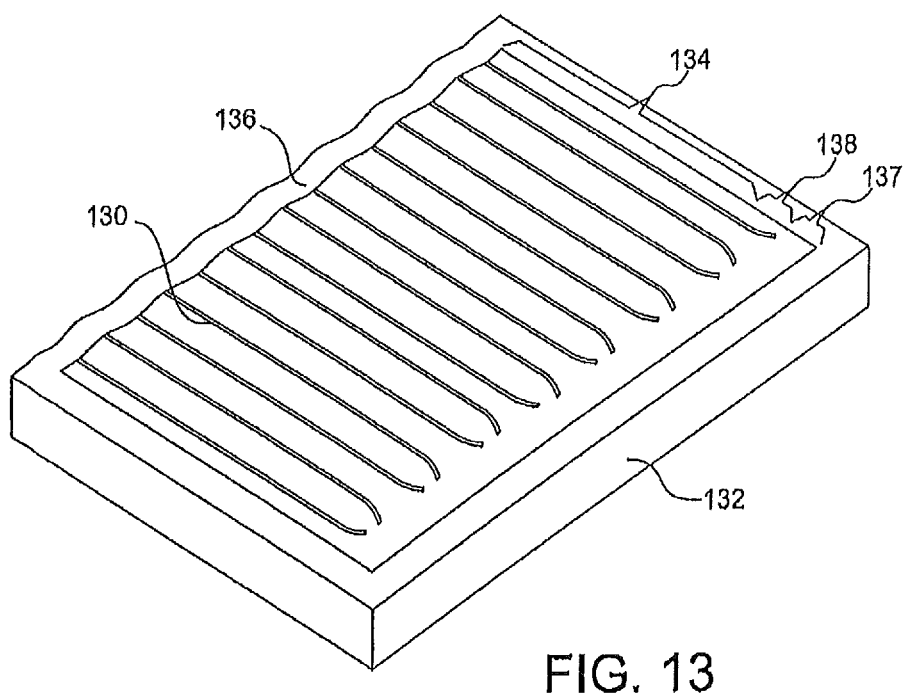
FIG. 13 shows a nearly flat lamination on a lamination mandrel.

FIG. 13 shows a nearly flat lamination 130 on a lamination mandrel 132. Mandrel 132 has a substantially uniform wave section is created on a first section 134 of mandrel surface 136 by providing a series of regularly occurring "peaks" and "valleys". A second section 137 of mandrel surface 136 is substantially flat; i.e. having no "peaks" or "valleys" extending from the first section 134. A transition zone 138 exists between first section 134 and second section 137. When the laminate, produced on lamination mandrel 132, is transferred to cure mandrel, the laminate will nest on the surface without the presence of wrinkles.

Figure 14:
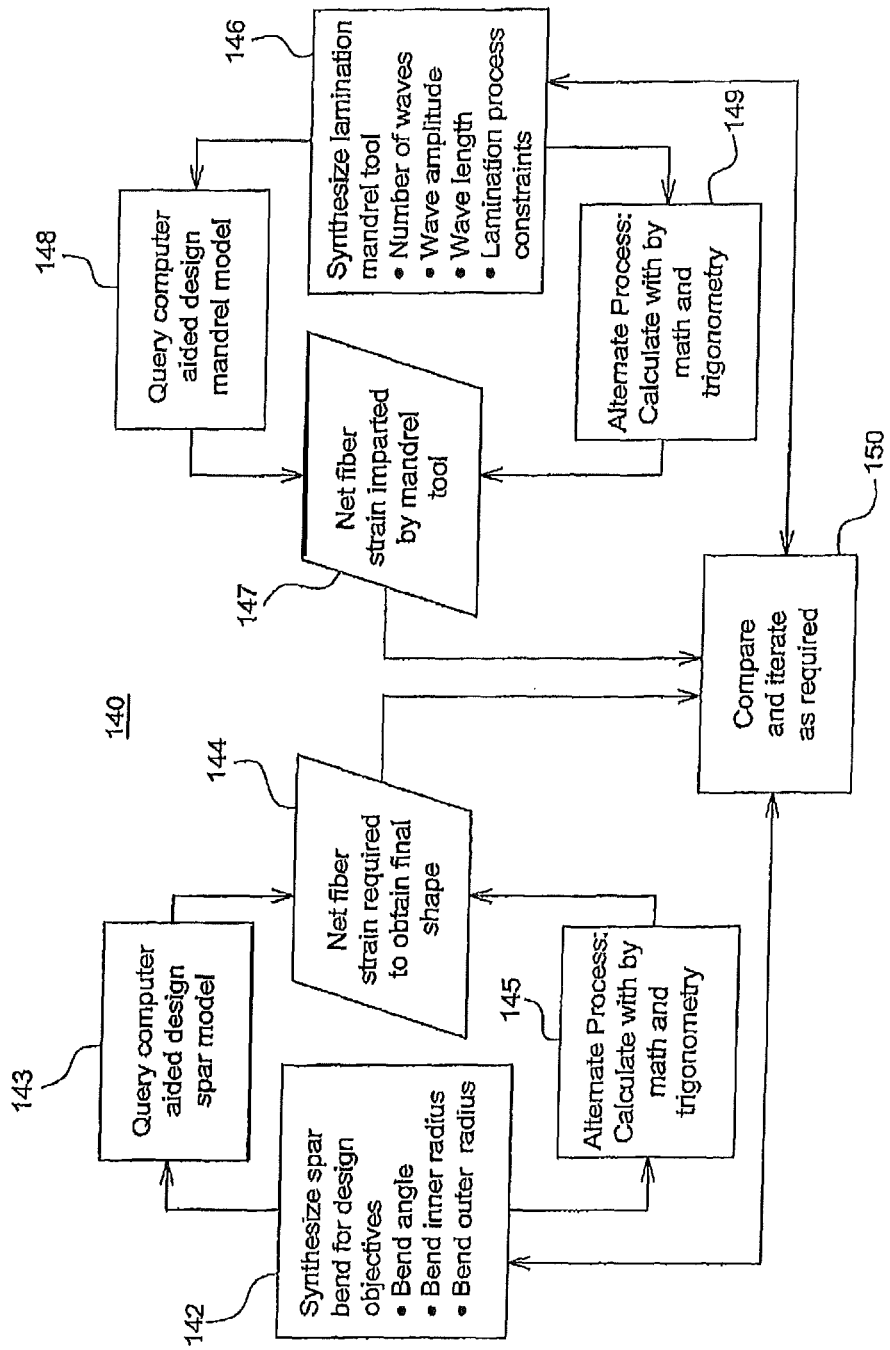
FIG. 14 is a flowchart describing one preferred system for designing lay up mandrels that provide a desired geometry.

FIG. 14 shows a flowchart for one system 140 of the present disclosure used to produce a specified, desired, pre-selected lay-up mandrel geometry. The flowchart process, as shown, produces a lay-up mandrel design suitable for producing a desired, finished spar bend geometry for a non-ruled part, a known corrugation amplitude and corrugation wavelength is manufactured into the laminate. The flowchart may be used in principal for variations presented in the present disclosure. Starting with spar design objectives, an airframe designer synthesizes a spar bent design 142. The designer then determines the total fiber strain required 144 to produce the non-ruled surface, either by querying the computer model 143, or by mathematical analysis 145. A tool designer synthesizes a mandrel design 146. The designer than determines the total fiber strain produced 147 to produce the non-ruled surface, either by querying the computer model 148 or by mathematical analysis 149. The required strain 144 is compared in step 150 to the produced strain 147. Either the spar design or the mandrel design may be iterated until the strain values are substantially equivalent. Similar processes may be applied for the formation of other three-dimensional objects with curves, multiple angles, irregular features, etc.

Figure 15:
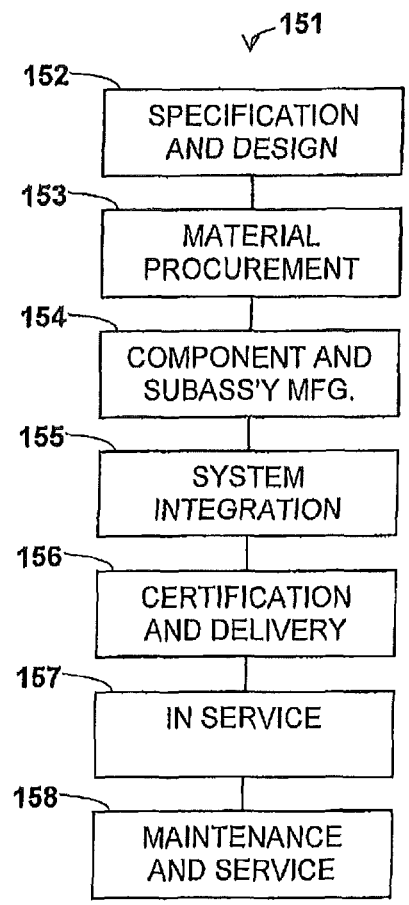
FIG. 15 is a flow diagram of aircraft production and service methodology.
Figure 16:
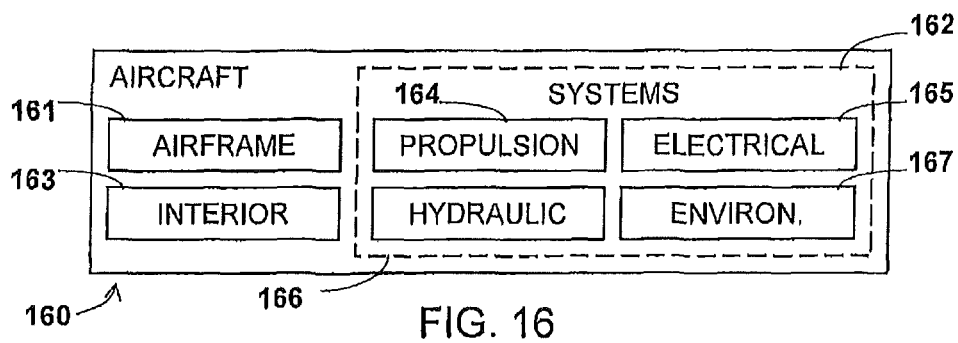
FIG. 16 is a block diagram of an aircraft.

Referring more particularly to the drawings, embodiments of the disclosure may be described in the context of an aircraft manufacturing and service method 151 as shown in FIG. 15 and an aircraft 160 as shown in FIG. 16. During pre-production, exemplary method 151 may include specification and design 152 of the aircraft 160 and material procurement 153. During production, component and subassembly manufacturing 154 and system integration 155 of the aircraft 160 takes place. Thereafter, the aircraft 160 may go through certification and delivery 156 in order to be placed in service 157. While in service by a customer, the aircraft 160 is scheduled for routine maintenance and service 158 (which may also include modification, reconfiguration, refurbishment, and so on).

Each of the processes of method 151 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 160 produced by exemplary method 151 may include an airframe 161 with a plurality of systems 162 and an interior 163. Examples of high-level systems 162 include one or more of a propulsion system 164, an electrical system 165, a hydraulic system 166, and an environmental system 167. Any number of other systems may be included. Although an aerospace example is shown, the principles of the invention may be applied to other industries, such as the automotive industry.

Apparatus and methods embodied herein may be employed during any one or more of the stages of the production and service method 151. For example, components or subassemblies corresponding to production process 154 may be fabricated or manufactured in a manner similar to components or subassemblies produced while the aircraft 160 is in service. Also, one or more apparatus embodiments, method embodiments, or a combination thereof may be utilized during the production stages 154 and 155, for example, by substantially expediting assembly of or reducing the cost of an aircraft 160. Similarly, one or more of apparatus embodiments, method embodiments, or a combination thereof may be utilized while the aircraft 160 is in service, for example and without limitation, to maintenance and service 158.

Various materials may be selected for fabricating lamination mandrels, depending on the use and durability required, such as, for example, wood, plastic, reinforced plastic, metal, etc., and combinations thereof. According to the disclosure, the desired lamination mandrels preferably do not require the use of high temperature materials that are typically used for cure mandrels. Generally, the accuracy requirements of lamination mandrels are not as demanding as the accuracy requirements of cure mandrels. According to a further variation, the lamination mandrels of the present disclosure may comprise a surface treatment, such as, for example, polytetrafluoroethylene (PTFE) adhesive tape, or other suitable surface treatments as desired, to facilitate the removal of uncured laminated article from the mandrel.

Although most examples here have discussed usefulness of variations of the present disclosure for producing parts for structures to be positioned on the exterior or interior of atmospheric and aerospace vehicles and other objects and structures designed for use in space or other upper-atmosphere environments, further uses abound where presently-disclosed variations would be useful in connection with, for example, the operation of manned or unmanned objects and structures in an atmospheric or space environment. Contemplated objects further include structures and vehicles, such as, for example, aircraft, satellites, rockets, missiles, etc., and therefore include manned and unmanned aircraft, spacecraft, terrestrial, non-terrestrial and even surface and sub-surface water-borne marine vehicles, objects, and structures.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

I claim:

1. A method for forming a three-dimensional object comprising the steps of:
    providing a lamination mandrel having preselected areas comprising non-planar surface features;
    providing a laminate material onto the lamination mandrel;
    forming a laminate, said laminate comprising additional fiber lengths at the preselected non-planar surface features of the lamination mandrel;
    removing the laminate from the lamination mandrel; and
    forming the laminate into a three-dimensional object, said three-dimensional object comprising a non-ruled surface, said object comprising a wrinkle-free surface.

2. The method of claim 1, further comprising the steps of:
    providing a forming mandrel; and
    providing the laminate with non-planar areas in preselected locations to the forming mandrel to form the laminate into an object, said object comprising a wrinkle-free surface.

3. The method of claim 1, wherein the non-planar features comprise raised areas.

4. The method of claim 1, wherein the laminate is a fiber-containing laminate.

5. The method of claim 1, wherein the non-planar surface features comprise a surface area that increases the surface area of the laminate.

6. The method of claim 1, wherein the preselected areas comprising non-planar surface features comprise a plurality of preselected geometric configurations.

7. The method of claim 1, wherein the object is selected from the group consisting of: a joggled blade stringer, a joggled hat stringer and a curved spar.

8. A method for forming a three-dimensional object comprising the steps of:
    providing a lamination mandrel having preselected locations comprising non-planar surface features;
    providing a laminate material onto the lamination mandrel;
    forming a laminate, said laminate comprising additional fiber lengths at the preselected non-planar surface features of the lamination mandrel;
    removing the laminate from the lamination mandrel;
    forming the laminate into a three-dimensional object, such that said object comprises a wrinkle-free surface;
    providing a forming mandrel;
    providing the -three-dimensional object to the forming mandrel; and
    forming the three-dimensional object into an object comprising a non-ruled surface, said non-ruled surface comprising a wrinkle-free surface.

9. The method of claim 8, wherein the non-planar features comprise raised areas.

10. The method of claim 8, wherein the laminate is a fiber-containing laminate.

11. The method of claim 8, wherein the preselected areas comprising non-planar surface features comprise a plurality of preselected geometric configurations.

12. The method of claim 8, wherein the object is a non-ruled part comprising a substantially wrinkle-free surface.

13. The method of claim 8, wherein the object is selected from the group consisting of: a joggled blade stringer, a joggled hat stringer and a curved spar.

* * * * *